May 29, 1945.   C. E. PATTERSON   2,376,979
POWER EARTH MOVER
Filed July 24, 1943   6 Sheets-Sheet 4

INVENTOR:
CECIL E. PATTERSON,
By Chas. M. Nissen,
ATTY.

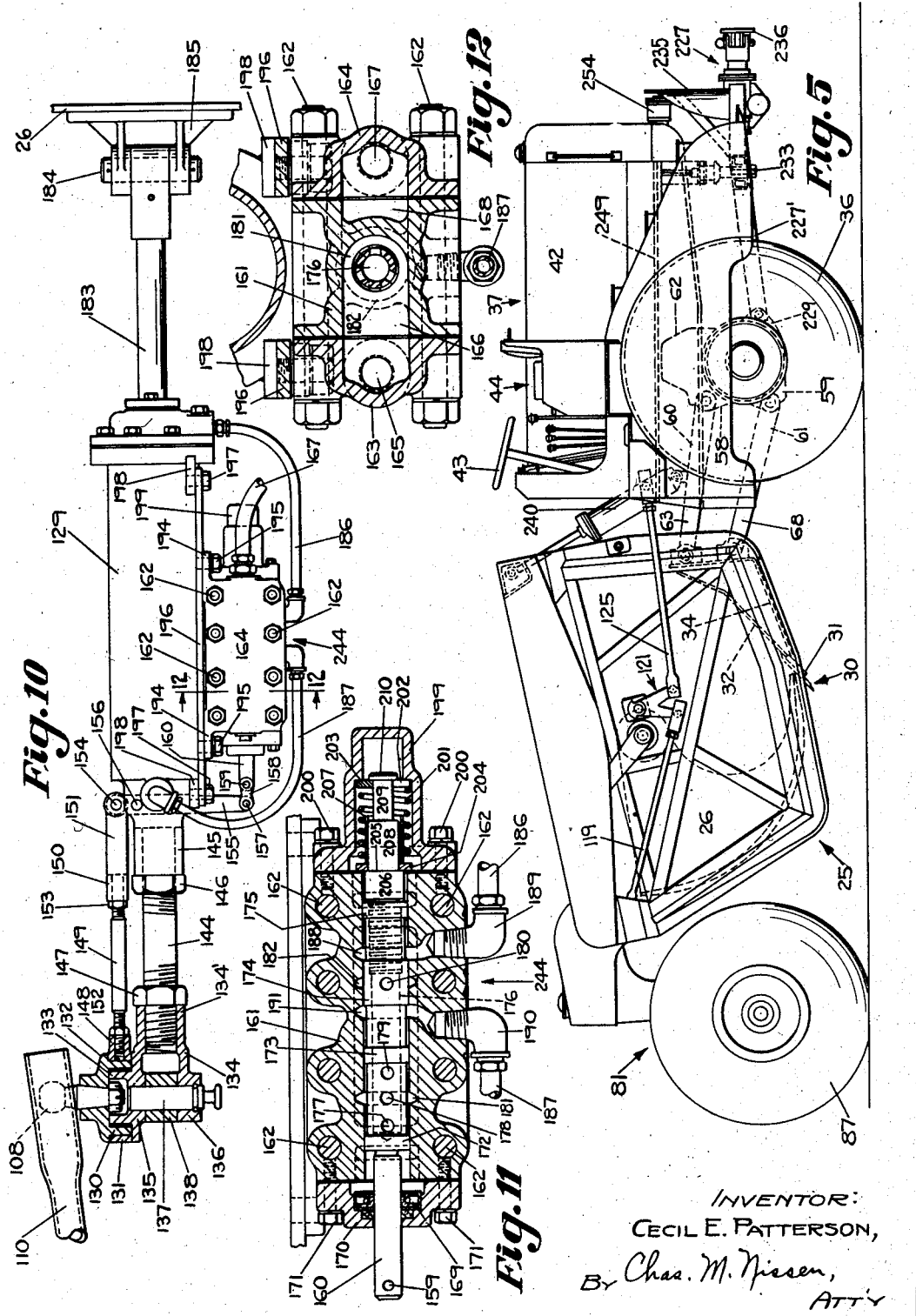

May 29, 1945. C. E. PATTERSON 2,376,979
POWER EARTH MOVER
Filed July 24, 1943 6 Sheets-Sheet 6
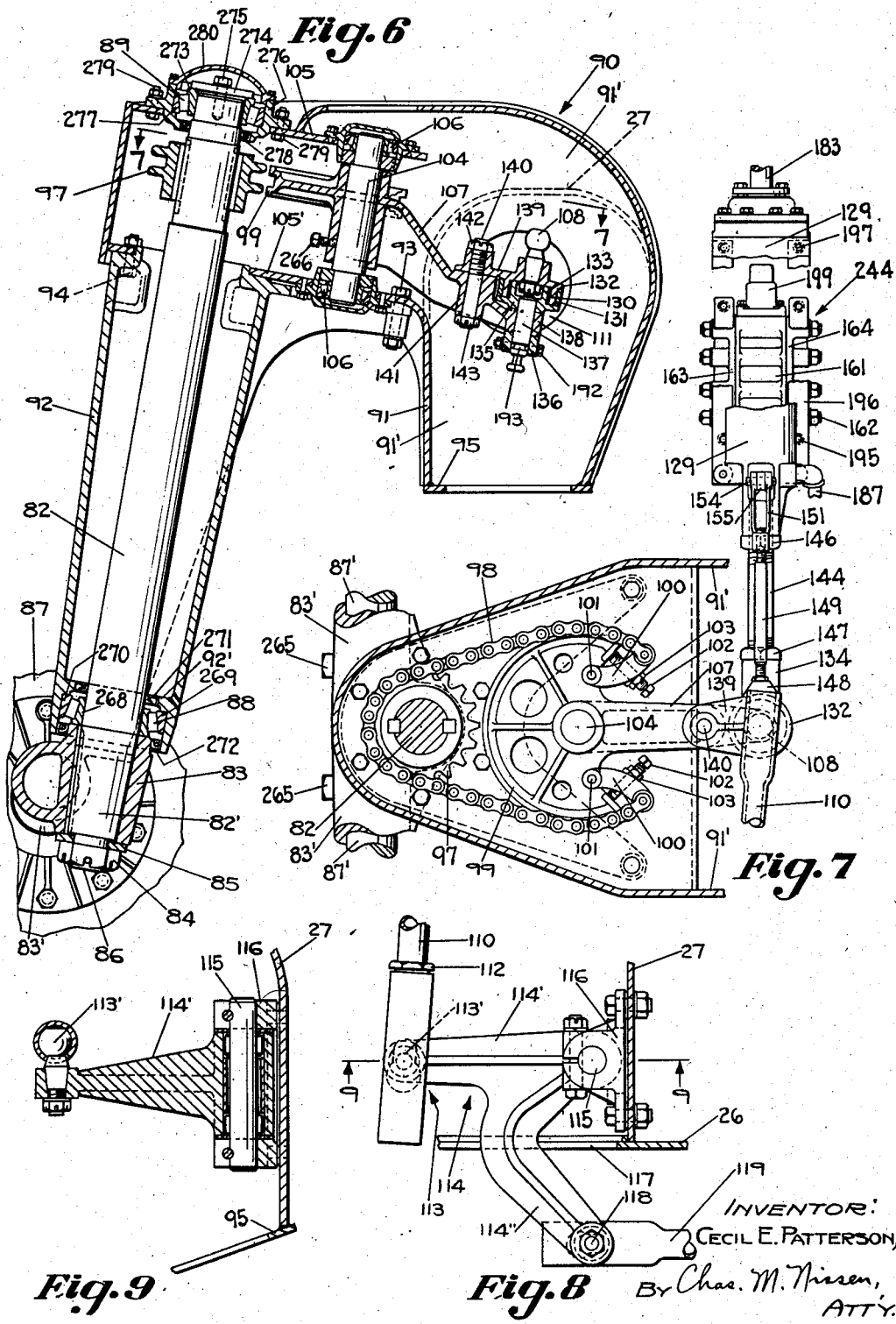
INVENTOR:
CECIL E. PATTERSON,
By Chas. M. Nissen,
ATTY.

Patented May 29, 1945

2,376,979

UNITED STATES PATENT OFFICE 2,376,979

POWER EARTH MOVER

Cecil E. Patterson, McKeesport, Pa., assignor to The Galion Iron Works & Manufacturing Company, a corporation of Ohio Application July 24, 1943, Serial No. 496,060

10 Claims. (Cl. 37—126)

My invention relates to earth movers of the type which gathers earth from the ground surface and carries such gathered material to other places where it is to be unloaded and spread for filling in or building up purposes, and one of the objects of my invention is the provision of improved and efficient apparatus of this type.

Another object of the invention is the provision of improved mechanism for carrying the front end of an earth moving bowl on a steering wheel unit and carrying the rear end of the earth moving bowl on a supporting unit and associating with such units adjusting mechanism to facilitate the operation of the machine in gathering, hauling and spreading material.

A further object of the invention is the provision of improved steering mechanism for an earth mover, one end of which is carried by a steering wheel unit and the other end of which is carried by a supporting unit.

Another object of the invention is the provision of a power operated unit combined with pusher mechanism to enable a separate tractor to add its power in the operation of the machine.

A further object of the invention is the provision of pusher mechanism in an earth mover having a ground cutting blade to enable a separate tractor to push the machine while the cutting blade is making a deep cut in the ground surface.

Another object of the invention is the provision of a self-propelled earth mover having a ground cutting blade, combined with pushing mechanism for engagement by a separate tractor, so that after material has been gathered by deep cuts with the help of the separate tractor the self-propelled earth mover may be used alone for hauling and spreading purposes.

A further object of the invention is the provision of improved and efficient supporting connections between the rear end of an earth moving bowl and a supporting unit including means for tilting the bowl without materially tilting the supporting unit.

Another object of the invention is the provision of improved pushing connections between a power traction unit and an earth moving bowl in advance of the same.

A further object of the invention is the provision of an improved receiving plate back of a ground cutting blade combined with an ejector having its lower edge guided to scrape along such receiving plate during an ejecting operation, and associated with lateral abutments in position to be engaged by the ejector to facilitate restoration of the latter to initial position.

Another object of the invention is the provision of an improved and efficient hydraulic system for earth movers including hydraulic reciprocating motors for tilting an earth receiving bowl, for controlling a gate associated with a front opening in the bowl, for operating an ejector in the bowl, and for operating the steering wheel unit.

More particularly it is the object of the invention to provide improved and efficient hydraulic reciprocating motor mechanism on the front end of the carrier of an earth mover, connected to the steering wheel unit to operate the same by control from a station on the rear supporting unit.

Other objects of the invention will appear hereinafter, the novel features and combinations being set forth in the appended claims.

This application is a continuation in part of my co-pending application S. N. 349,765, filed August 2, 1940, for an improvement in Power earth mover.

Figs. 1 and 2 placed end to end, show a side elevation of a power-operated earth mover embodying my invention;

Fig. 2ª is a plan view of a portion of the rear supporting unit shown in elevation in Fig. 2;

Figs. 3 and 4, placed end to end, show a plan view of the power-operated earth mover;

Fig. 5 is a side elevation similar to Figs. 1 and 2 placed end to end, but with the connections between the power tractor and the bowl frame in the relative positions which they occupy during the transportation of the gathered material from place to place.

Fig. 6 is a sectional elevational view of the steering head and the steering mechanism mounted therein;

Fig. 7 is a sectional plan view taken on the line 7—7 of Fig. 6;

Fig. 8 is an enlarged plan view of the bell crank shown in dotted lines at the lower left-hand corner of Fig. 3;

Fig. 9 is a sectional view taken on the line 9—9 of Fig. 8, looking in the direction of the arrows;

Fig. 10 is an elevational view of the hydraulic motor mechanism for operating the steering wheel unit;

Fig. 11 is a longitudinal sectional elevation of the interior structure of the valve mechanism shown in side elevation in Fig. 10;

Fig. 12 is a transverse section taken on the line 12—12 of Fig. 10, looking in the direction of the arrows;

Fig. 13 is a sectional elevation taken on the line 13—13 of Fig. 1, looking in the direction of the arrows; and Fig. 14 represents a piping diagram for the hydraulic apparatus used in making the various adjustments including that of the steering wheel unit.

Figure 1:
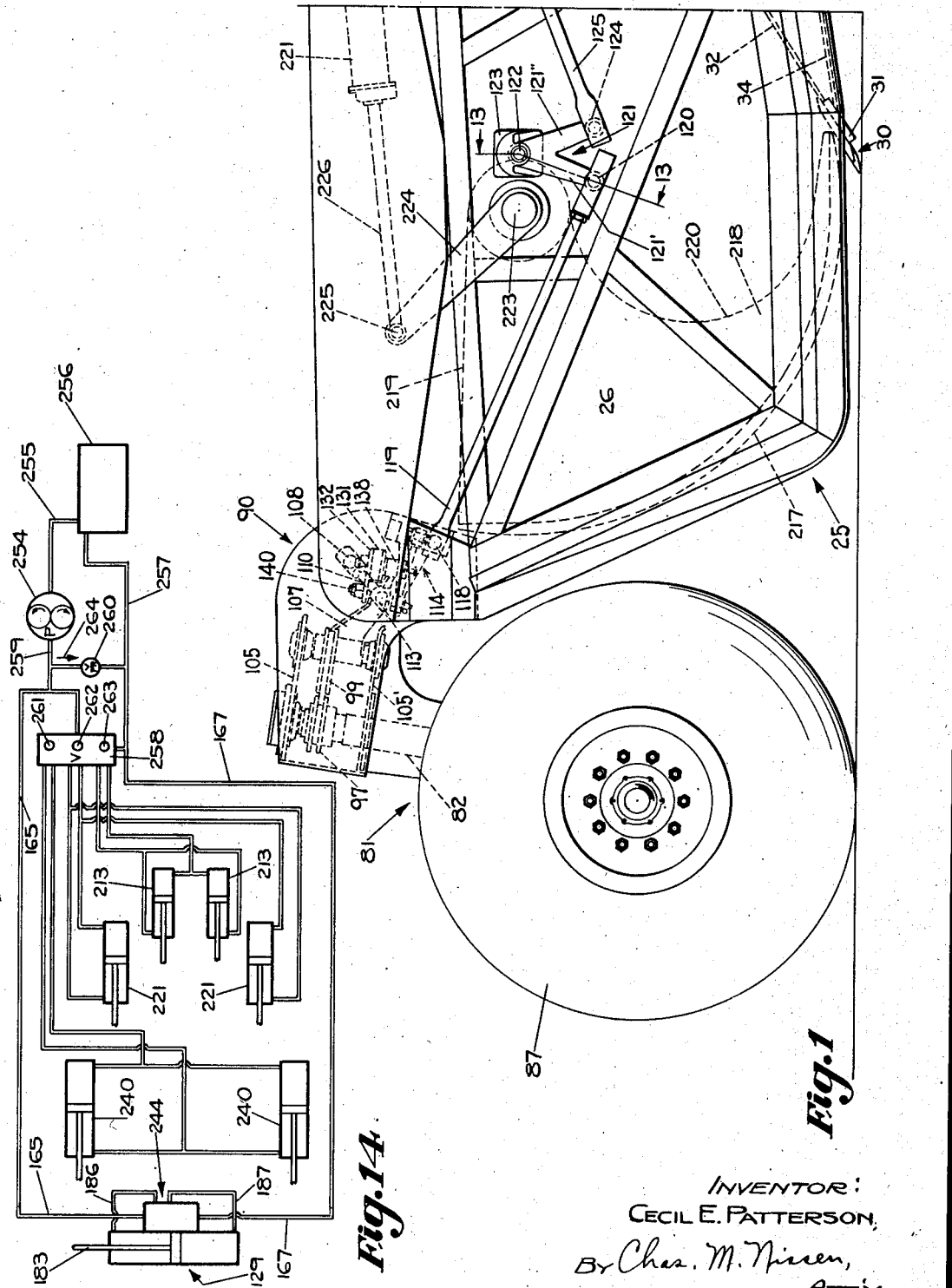
Figure 2:
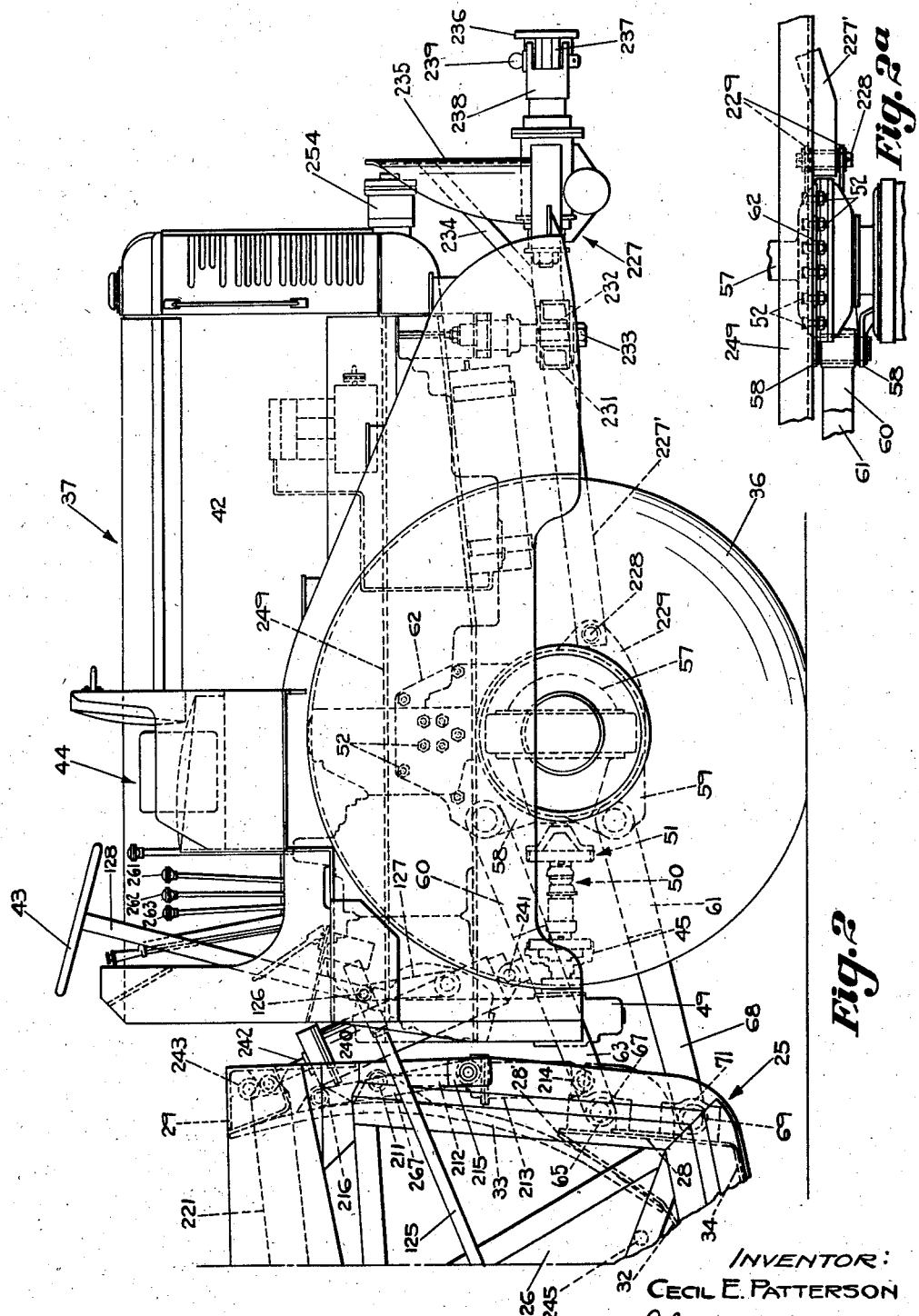
Figure 3:
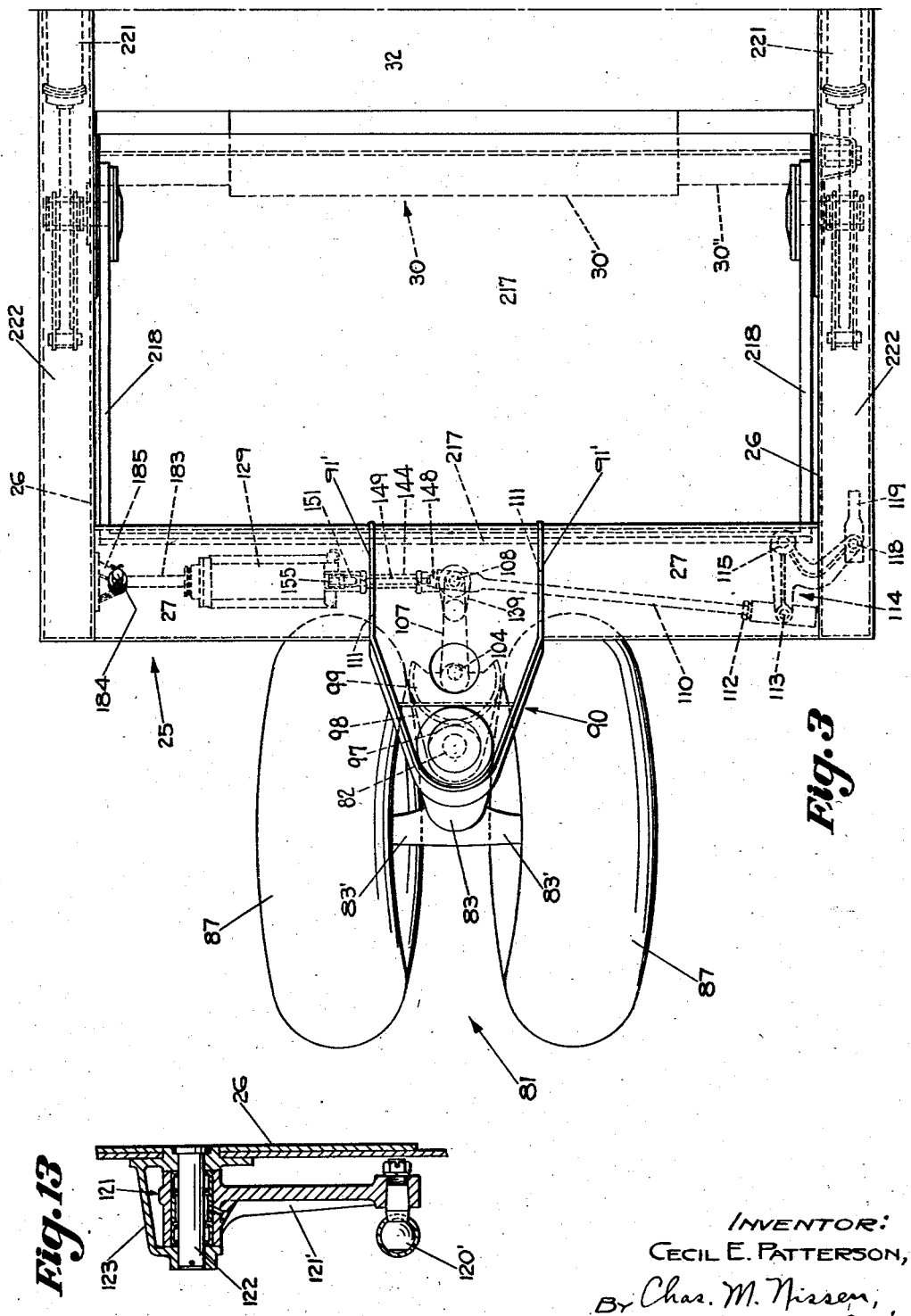
Figure 4:
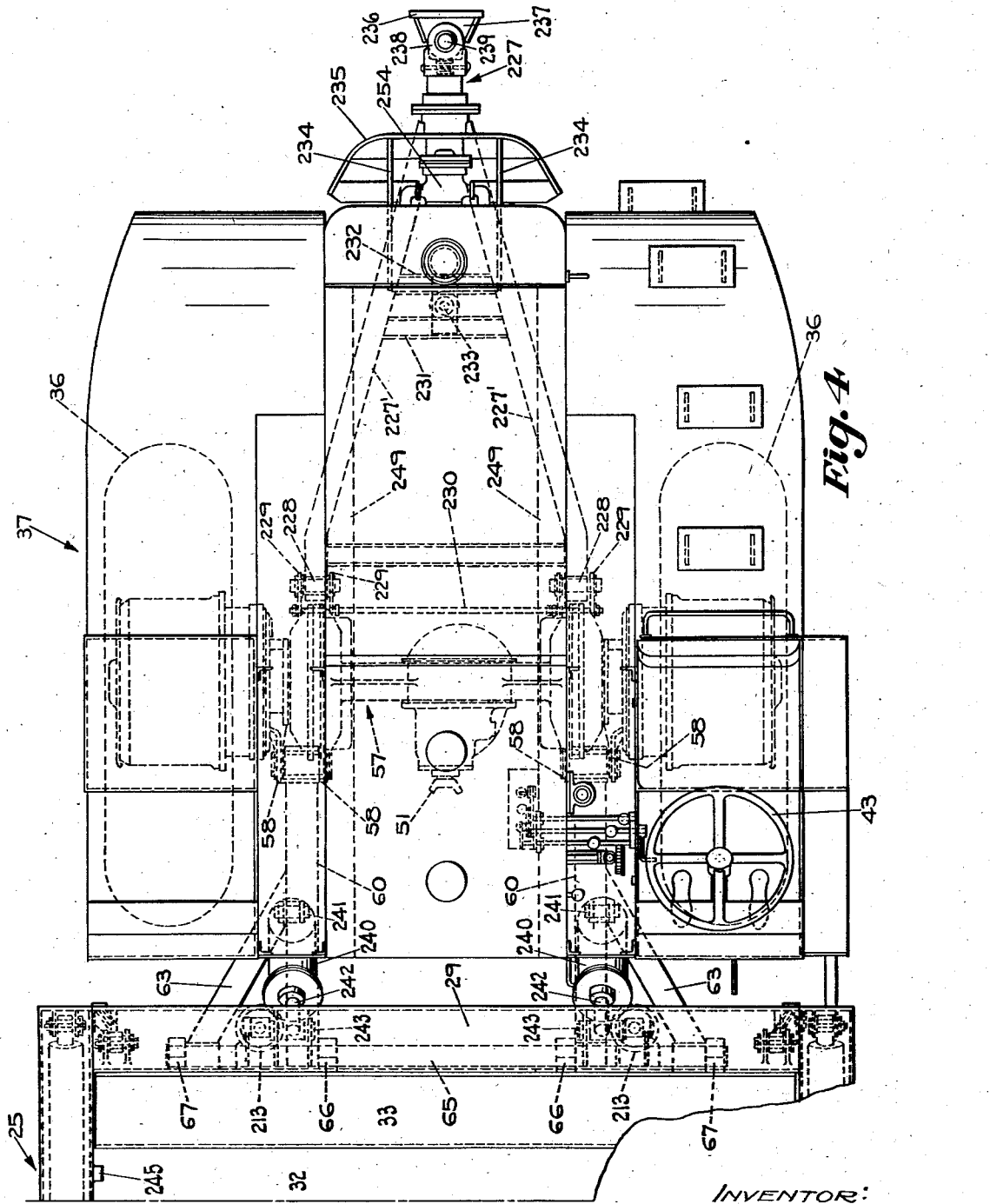

Referring to Figs. 1 and 2 placed end to end and Figs. 3 and 4 placed end to end, it will be seen that 25 designates the framework for the bowl or earth carrier comprising side plates 26, 26 the upper front corners of which are connected by the cross-plates 27. The rear ends of the side plates 26, 26 are connected by the upright back plate 28 and rear upper cross-plate 29.

Extending entirely across the bowl framework between the side plates 26, 26 is a transverse scraper or cutting blade 30 secured rigidly to a reinforcing plate 31 as shown in Fig. 1. Extending rearwardly from the scraper or cutting blade 30 is a receiving plate or moldboard 32. This receiving plate 32 spans the space between the inner walls of the side plates 26, 26 and extends upwardly and rearwardly for connection at 28' to the upright back plate 28 which is an extension of the bottom plate 34, as shown in Figs. 1 and 2 placed end to end.

The power traction unit 37 comprises an internal combustion engine 42, the radiator of which faces rearwardly. A steering wheel 43 is mounted adjacent the operator's seat 44. At the operator's station are also the various levers for shifting the gears in the transmission for various speeds ahead and rearward. The operator may also control from his station the clutch mechanism and the brake mechanism and at the operator's station are also placed a plurality of valves one for controlling each pair of the hydraulic reciprocating motors, as hereinafter more fully explained. The bowl frame being entirely open at its top as shown in Figs. 3 and 4 placed end to end, the operator from his station can easily observe either the filling or the emptying of the earth carrier and therefore operate the controls accordingly to secure efficiency both in gathering the material and in spreading it.

The crank shaft of the internal combustion engine 42 is connected by means of a clutch to the variable speed transmission and the latter in turn is connected through a train of gearing in the transfer case 49 to the coupling member 45 shown in dotted lines in Fig. 2. By means of universal joint 50 the coupling member 45 is connected to the coupling member 51 which in turn is connected to the differential transmission in the axle housing 57.

Power is supplied to the axles in the axle housing 57 and thence to the ground engaging traction wheels 36 which are secured to the ends of such axles.

The axle housing 57 of the power traction unit is preferably of steel secured rigidly to the chassis frame of the internal combustion engine 42. Although the axle housing 57 may be in sections, these sections are rigidly bolted together. The axle housing 57 being rigidly secured to the supporting chassis frame for the internal combustion engine, moves bodily with the latter when tilted in either direction. For balancing purposes, the engine is mounted on and over the axle housing intermediate the ends of the engine preferably with the flywheel of the engine directly above the axle, and while the power traction unit would be an unstable tractor when disconnected from the bowl framework, means are provided for stabilizing the traction unit and even keeping the same substantially horizontal for the various positions of the bowl framework relative to the ground surface, thus adding to the comfort of the operator at his station during all operations.

The internal combustion engine is mounted on the chassis frame 249 which comprises spaced-apart parallel longitudinal beams shown in dotted lines in Figs. 2, 4 and 5. Spaced-apart vertical plates 62, rigidly secured to the axle housing 57, extend upwardly therefrom on the outer sides of the beams of the chassis frame 249. These plates are bolted at 52 to the outer sides of these beams. It will thus be seen that the axle housing 57 is rigidly connected to the chassis frame 249 to constitute rigidly connected framework. This rigidly connected framework is mounted on the ground engaging traction wheels 36 to constitute a rear supporting unit for the rear end of the earth carrier.

Rigidly connected to the axle housing 57 and extending forwardly therefrom are two pairs of brackets 58, 59 as illustrated in Figs. 2, 2a and 4. Pivotally connected to the pairs of brackets 58 and 59 are forwardly and downwardly extending links 60 and 61. As shown in Fig. 4, the pairs of brackets 58 and 59 are located in spaced-apart positions along the axle housing 57 and rigidly secured thereto. It will thus be seen that there are two spaced-apart parallel links 60, 60 and two spaced-apart parallel links 61, 61 having their rear ends pivotally connected to the axle housing 57 and all extending forwardly and downwardly from the latter when the transverse blade 30 is in the ground surface scraping position shown in Figs. 1 and 2.

Each of the forwardly extending links 60 and 61 is provided with a branching arm 63 and 68, respectively, as shown in Fig. 4. The links 60 and 61 together with their branching arms may each be of box-like construction. The forward ends of the links 60, 60 are keyed to the transverse shaft 65 which is a rock shaft journaled in the bearings 66, 66 and 67, 67 secured to the back of the plate 28 shown in dotted line side elevation in Fig. 2.

In a similar manner the lower links 61, 61 together with their branch arms are keyed to the rock shaft 69 (Fig. 2) which is journaled in the bearings 71. The shafts 65 and 69 serve as torsion shafts to stabilize the connections between the axle housing and the bowl frame.

The cutting blade 30 is preferably composed of sections 30' and 30" placed end to end as shown in Fig. 3 with the middle section 30' extending forwardly beyond the end sections 30". By placing Figs. 3 and 4 end to end it will be seen that the tractor wheels 36, 36 track inside of the ends of the ground cutting element 30. While the intermediate section 30' makes a relatively deep cut, the end sections 30" will cut suitable pathways for the tractor wheels 36, 36. This arrangement enables the tractor wheels to avoid irregularities of the ground surface and reduces to a minimum the transverse tilting of the tractor unit.

In order that the earth mover shown in elevation in Figs. 1 and 2 placed end to end and in plan in Figs. 3 and 4 placed end to end, may be steered on a relatively short radius, I have provided a steering unit 81 at the front central portion of the bowl frame. This steering wheel unit 81 comprises a steering post 82 which is splined at its lower end to the axle casting 83. The lower end 82' of the steering post 82 is preferably conical, tapering downwardly as shown in Fig. 6, so that a nut 84 may be threaded onto the lower extension 86. A washer 85 is clamped against the bottom of the axle casting 83 when the nut 84 is tightened and in this way the conical end 82' is wedged into the conical recess in the axle casting 83 to rigidly connect the steering post 82 thereto.

The steering wheel unit 81 comprises two spaced-part ground engaging wheels 87, 87. As shown in Fig. 3, the axle casting 83 has lateral extensions 83', 83' to which are bolted at 265, 265 the stub axles 87', 87', on the outer ends of which are journaled the wheels 87, 87.

By means of opposing thrust bearings 88 and 89 the steering post 82 is journaled to the steering head 90 which comprises a casing having a goose neck shape as shown in Fig. 6. This casing is preferably in two sections 91 and 92 which are bolted together at 93 and 94. The rear section 91 extends rearwardly and downwardly into an open space between the inner ends of the front upper cross-piece sections 27, 27 of the bowl frame 25. The inner ends of the cross-piece sections 27, 27 fit against the flat parallel outside surfaces 91', 91' (Fig. 3) and are welded thereto. It can readily been seen by referring to Fig. 6 that the cross-piece sections 27, 27 extend a substantial distance upwardly above the bottom plate 95 at the lower end of the steering head section 91.

The front upper side of the bowl frame may be provided with a cross-piece for co-operation with the sections 27, 27 in connecting the side plates 26, 26 of the bowl frame, leaving the space back of the cross-piece open, as shown in Fig. 3, and leaving the space below the cross-piece open between the side-plates 26 all the way to the transverse cutting blade 30 when the rotating gate 96 is in its uppermost position.

As shown in Figs. 6 and 7, a sprocket 97 is keyed to the steering post 82 and adapted to be connected by the sprocket chain 98 to the guide segment 99, as shown in Fig. 7. The free ends of the sprocket chain 98 are connected to levers 100, 100 which are pivoted at 101, 101 to the guide segment 99. By means of the set screws 102, 102 the slack in the sprocket chain 98 may be adjusted and the set screws locked in adjusted position by means of the nuts 103, 103.

The guide segment 99 may be splined or otherwise secured to the shaft 104 as by means of the set screw 266 (Fig. 6). Integral with the segment 99 is a rearwardly extending arm 107, on which is mounted a ball 108 adapted to be connected to the drag link 110 which extends transversely through an opening 111 in the plate 91'. Both of the plates 91' are provided with openings 111 so that the drag link 110 may extend through one of them and the rods 144, 149 through the other, while the corresponding cross-piece section 27 acts as a hood to protect the enclosed portion of the steering mechanism. The drag link 110 may be adjusted as to length and may be locked in adjusted position at 112.

As shown in Fig. 3, the drag link 110 extends to the upper left-hand corner of the top of the bowl frame for ball and socket joint connection at 113 to the bell crank 114 which is pivoted at 115 to a bracket 116 bolted to the plate 27, as shown in Fig. 8. Fig. 9 is a sectional elevation taken on the line 9—9 of Fig. 8, looking in the direction of the arrows. The arm 114' of the bell crank 114 is provided with a ball 113' for connection at 113 to the drag link 110. The other arm 114" of the bell crank 114 extends through an opening 117 for connection at 118 to the forward end of the drag link 119.

As shown in Fig. 1, the drag link 119 extends rearwardly and downwardly for ball and socket joint connection at 120 to the bell crank 121 which is pivoted at 122 to the outer side of the plate 26. The bell crank 121 is mounted on a bracket 123 as shown in Figs. 1 and 13, Fig. 13 being a section taken on line 13—13 of Fig. 1, looking in the direction of the arrows. As shown in Fig. 13, the lower end of the arm 121' carries a ball 120'. The other arm 121" of the bell crank 121 is connected by a ball and socket joint 124 to the front end of the drag link 125, the rear end of which is connected by means of the ball and socket joint at 126 to the lever 127 shown in dotted lines in Fig. 2. It should be understood that each of the drag links 110, 119 and 125 may be adjusted in length and held at adjusted length.

As shown in Figs. 3 and 4 placed end to end, the steering mechanism for the steering wheel unit 81 is extended along the left-hand side of the bowl frame because the steering wheel 43 is located at the left-hand side of the power traction unit.

The steering post 128 of the manual steering wheel 43 has secured to its lower end portion a worm which meshes with a worm wheel segment, the shaft of the latter being keyed to the lever arm 127. By manually turning the wheel 43, the lever arm 127 may be swung forwardly or rearwardly to advance or retract the drag link 125 and thus transmit movement through the various connections to the drag link 110 to effect operation of the valve mechanism shown in Fig. 11 to control the hydraulic motor 129 which is operatively connected to the steering wheel unit 81.

As shown in Figs. 6 and 10, the ball 108 is secured to a swinging arm 139 and a depending cup 130. Journaled on the outer cylindrical surface of the cup 130 is a cylindrical ring or strap 131 which fits between the annular flange 132 of the cup 130 and the circular bearing surrounding the upwardly extending cup 133 that telescopes loosely into the interior of the depending cup 130. The cup 133 is integral with the connector 134 which comprises vertically spaced journal bearings 135 and 136 for receiving the upright pivot pin 137.

The rear end of the arm 107 (Fig. 6) is provided with a collar or ring 138 the opening through which is adapted to register with the openings in the journal bearings 135, 136, to receive the pivot pin 137.

The depending cup 130 is integral with the arm 139, the front end of which is provided with a screw threaded opening to receive the bolt 140. This bolt serves as a pivot pin since it extends downwardly through the journal bearing 141 carried by the arm 107. A nut 142 is provided to rigidly secure the bolt 140 to the arm 139 and a lock nut 143 serves to keep the pivot bolt 140 from becoming detached from the arm 107. Since the inner diameter of the depending cup 130 is greater than the outer diameter of the upstanding cup 133, the arm 139 may have a limited swinging movement on the pivot 140 relatively to the connector 134 for a purpose hereinafter fully explained.

As shown in Fig. 10 an actuating rod 144 has one of its screw threaded ends secured to one end of the cylinder of the hydraulic motor 129 and its other screw-threaded end secured to the connector 134. The screw threads at the ends of the rod 144 may, if desired, be right and left-handed so that when rotated, the protuberances 134' and 145 will be spread apart or drawn together so as to adjust the distance between the pivot pin 137 and the cylinder of the hydraulic motor 129. After such adjustment has been made, the lock nuts 146 and 147 may be relied on to hold the rod 144 in adjusted position relative to the connector 134 and the cylinder of the hydraulic motor 129.

The strap 131 is provided with a protuberance 148 having a screw-threaded recess to receive one screw-threaded end of the connecting rod 149, the other screw-threaded end of which extends into the screw-threaded cup 150 of the bar or yoke 151. The ends of the connecting rod 149 may, if desired, be right and left-hand screw threaded to enable turning of the rod 149 to spread apart or bring closer together the strap 131 and the yoke or bar 151. The lock nuts 152 and 153 may be relied on to hold the connection at adjusted length.

The right-hand end of the bar 151 is pivoted at 154 to the upper end of the lever 155 which in turn is pivoted at 156 to the cylinder of the hydraulic motor 129. The lower end of the lever 155 is pivoted at 157 to a link 158 which in turn is pivoted at 159 to the valve stem 160. Since the pivot 156 is much nearer the pivot 154 than to the pivot 157, the shorter arm of the lever 155 is connected to the bar 151. Consequently the relatively small movement permitted between the cups 130 and 133 will be amplified into a much greater movement of the valve stem 160.

Referring to Figs. 10, 11 and 12, which are all in elevation, side and sectional, the valve block 161 is clamped by means of the bolts 162, 162 between the side plates 163 and 164. The plate 163 is provided with an intake or supply passageway 165 which registers with a supply port 166 on one side of the valve block 161. The plate 164 is provided with an exhaust passageway 167 which registers with the exhaust port 168 on the other side of the valve block 161.

The valve stem 160 extends through the liquid seal 169 at the center of the end plate 170 which is secured by means of the screws 171, 171 to the valve block 161.

The valve stem 160 is rigidly connected to the valve proper which comprises a plurality of cylindrical pistons rigidly connected together and each fitting in the valve cylinder. These pistons are shown at 172, 173, 174 and 175 in Fig. 11. The valve proper is hollow as indicated by the dotted lines 176 in this view. The ends of the tubular interior 176 are closed but radial openings 177, 178, 179 and 180 are provided.

The radial openings designated 177, 178, and 179 are located between the pistons 172 and 173 in a valve portion of reduced diameter and spaced from the cylinder wall. These radial openings 177, 178, 179 are always in communication with the circular groove 181 in the cylinder wall and this circular groove is always in communication with the supply port 166 as shown in Fig. 12. The supply pressure acts on the pistons 172 and 173 in opposite directions and effects a balanced pressure on the valve at this portion thereof.

The annular groove 182 is always in communication with the exhaust port 168 but is in communication with the radial opening 180 only when the valve is in neutral position as shown in Fig. 11. It will thus be seen that when the valve is in neutral position a no load by-pass will be established between the supply and exhaust ports because the fluid pressure medium will be free to pass from the supply port 166 through the annular groove 181 and thence through the radial openings 177, 178, 179 into the cylindrical interior 176, out through the radial opening 180 into the annular groove 182 and finally to the exhaust port 168.

The hydraulic motor 129 comprises a piston rod 183 the outer end of which is pivoted at 184 to the bracket 185 as shown in Fig. 10. This bracket is secured to one of the side plates 26 as shown in Fig. 3.

The fluid pressure medium such as oil is introduced into the ends of the cylinder of the hydraulic motor 129 on opposite sides of the piston therein, by means of the pipes 186, 187. When the valve stem 160 is moved to the right as viewed in Fig. 11, the radial opening 180 is moved into position to communicate with the annular groove 188 to which is connected the pipe 186 by means of the fitting 189. At the same time the pipe 187 is connected through the fitting 190 to the exhaust port by way of the annular grooves 191 and 192 which are now uncovered by the piston 174.

When the valve stem 160 is moved to the left as viewed in Fig. 11, the radial opening 180 is moved into position to communicate with the annular groove 191 which is connected to the pipe 187 by means of the fitting 190. At the same time the pipe 186 is connected through the fitting 189 to the exhaust port by way of the annular grooves 188 and 192 which are now uncovered by the piston 174.

It can readily be seen by referring to Figs. 3 and 10 that when the pressure supply is in the pipe 187 and the exhaust through pipe 186, the entire cylinder of the motor 129 will be moved toward the left side of the bowl frame, which will effect swinging of the arm 107 in a clockwise direction and consequently the steering wheel unit will be rotated clockwise on the axis of the king post 82 to steer the machine to the right. When the pressure supply is in the pipe 186 and the exhaust in the pipe 187 the cylinder of the motor 129 will be moved toward the right thereby swinging the arm 107 anti-clockwise to steer the machine to the left.

Since the rear end of the arm 107 moves arcuately, the motor 129 swings laterally on the pivot 184 as a center. The axis of the pivot 184 is preferably parallel to the axis of the pivot 137 as shown in Fig. 10.

It should be particularly noted that the steering wheel unit comprises two spaced-apart ground engaging wheels 87, 87 as shown in Fig. 3 and that the upright axis of the steering post 82 is between these wheels, so that when the hydraulic motor 129 turns the steering wheel unit, each of the wheels 87, 87 rolls in a circle. This arrangement distributes the weight of the front end of the machine and its load, so that the tendency of the steering wheel unit to sink into soft earth is greatly reduced and moreover if either wheel gets into a rut the other will enable it to roll out onto more level ground. The efficiency of the motor 129 is thus increased by the greater facility with which the steering wheel unit may be operated.

By referring to Fig. 6 it will be seen that a bolt 192 extends transversely through the journal bearing 136 so as to fit in the annular groove 193 in the pivot pin 137, thus locking the latter in its position shown in Fig. 6.

The arm 139 is locked to the arm 107 by means of the bolt 140 and the nuts 142, 143, although free to swing relatively to the arm 107 on the upright axis of the bolt 140. The cup 130 telescopes over the cup 133 and thus the various parts are in interlocking relation although they may be readily taken apart for repairs or replacements.

If desired, the rods 144 and 149 may be entirely detached. In that event the steering mechanism is entirely mechanical.

The extent to which the wheel 43 may be turned is limited by the lost motion between the cups 130, 133 (Fig. 10). However, the motor 129 quickly responds upon operation of the valve mechanism shown in Fig. 11. However, the valve mechanism automatically restores itself to neutral position as soon as the cylinder of the motor 129 moves a predetermined distance. For instance, if the valve stem 160 is moved to the left, the valve block 161 will be moved to the left until the pistons are again in the relative positions shown in Fig. 11.

The valve mechanism is suspended from and rigidly secured to the cylinder of the hydraulic motor 129 so as to move bodily with the latter. The side plates 163 and 164 are provided with upper end extensions 194, 194. By means of cap screws 195, 195 passing through these extensions the whole valve mechanism unit is secured to the plates 196, 196 and the ends of the latter by means of the cap screws 197, 197 are secured to the brackets 198, 198 which are welded to the cylinder of the motor 129.

As shown in Fig. 11, an enclosing cap 199 is secured by means of the cap screws 200, 200 to that end of the valve block 161 remote from the valve stem 160. Valve centering means comprising a spring 201 is located in the enclosing cap 199. Whenever the operator turns the wheel 43 to the extent permitted by the spacing between the cups 130 and 133, he does so against the action of the spring 201. When the operator releases the wheel 43 the spring 201 will automatically move the valve pistons to their neutral positions shown in Fig. 11 if not already there. While movement of the cylinder of the motor 129 tends to restore the valve mechanism to neutral position the turning of the wheel 43 may be continuous to counteract this tendency so that movement of the cylinder of the motor 129 will likewise be continuous in accordance with the continued turning of the wheel 43. In other words, while the operation of the steering wheel unit 81 tends to be by increments, the latter may follow each other so closely as to make the turning of the steering wheel unit one continuous movement before stopping in position for desired steering of the machine.

The spring centering mechanism shown in Fig. 11 comprises a circular plate 202 which rests against an annular shoulder 203 on the interior of the cap 199. Another circular plate 204 rests against an annular shoulder 205 of the cylindrical block 206 and is provided with a cylindrical guide 207. The spring 201 is located between the plates 202 and 204 and surrounds the cylindrical guide 207 as shown in Fig. 11.

The cylindrical block 206 is screw-threaded into one end of the valve proper and serves to close that end of the cylindrical recess 176. The block 206 is provided with an extension 208 which fits in the cylindrical guide 207. Another extension 209 of reduced diameter passes through an opening in the center of the plate 202 and is provided with a head 210 of larger diameter than the opening in the plate 202. It will thus be seen that when the valve stem 160 is moved toward the right as viewed in Fig. 11, the shoulder 205 will engage the plate 204 and compress the spring 201 against the plate 202. When the valve stem 160 is moved to the left, the head 210 will move the plate 202 to the left, thereby compressing the spring 201 while the ring 204 rests against the adjacent end of the valve block 161. It will thus be seen that when the valve stem 160 after being moved in one direction or the other, is released, the spring 201 will automatically center the valve pistons by moving them to the position shown in Fig. 11.

As shown in Fig. 2, the ejector plate 33 is pivoted at 211 to the upper ends of the piston rods 212 which are connected to pistons in the cylinders 213 the lower ends of which are pivoted at 214 to brackets secured to the plate 28. Each of the hydraulic motors 213 is a double acting hydraulic motor so that the ejector plate 33 may be moved forwardly in the bowl frame or rearwardly to its position shown in Fig. 2. The ejector plate 33 is connected by a pair of links 267 to brackets 215. The lower ends of these links are pivoted to the brackets 215 while the upper ends are pivoted at 216 to the upper back portion of ejector plate 33. The relative relation between pivots 211 and 216 is shown in dotted lines in side elevation in Fig. 2.

It should be particularly noted that the aforesaid links 267 project upwardly and that therefore when the ejector plate is actuated by the hydraulic motors 213, the plate 33 and whatever material may be clinging thereto, will move downwardly and forwardly by gravity, with the lower edge of the ejector plate scraping along the inclined surface of the receiving plate or moldboard 32. Inasmuch as the motors 213 are double acting, they may be reversed rapidly by means of control valves so as to give the plate 33 a shaking or vibratory action to dislodge material that may be sticking thereto. The gate 217 is provided with spaced-apart parallel side plates 218, 218 each closely adjacent the inner walls of the side plates 26 as shown in Fig. 3. The upper edge 219 of each of the side plates 218 may be straight and approximately radial, but the rear edge is circular as indicated at 220 in Fig. 1.

The lower forward edges of the gate 217 are connected to a transverse curved plate having the shape of a segment of a cylinder shown in dotted lines in Fig. 1. The gate side plates 218 are pivotally connected by means of self-alining bearings to the side plates 26. Hydraulic motors 221, 221 may be located above and outside of the planes of the side plates 26 under the protection of the lateral protecting covers or shields 222 as shown in Fig. 3. The side plates 218 are connected by means of stub shafts 223 to the arms 224 and the upper ends of the latter are pivoted at 225 to the piston rods 226 of the reciprocating hydraulic motors 221.

As the machine moves forward for the gathering of a load by means of the cutting blade 30, the latter is in a relatively flat position to make a deep cut in the ground surface, and the lower edges of the plates 26 in advance of the blade 30 may be forced into the ground surface by action of the blade as it wedges into the ground. That this can readily be done may be understood from the fact that the bowl frame is entirely open in advance of the cutting blade and at such time, the gate 217 is in an upper position. As the moldboard 32 fills up with gathered material, the weight of such material is added to other weight on the traction wheels 36, thus increasing traction of the power traction unit 37.

As the rear portion of the bowl fills with material, the gate 217 is gradually moved down by the operator at his station operating the valve control levers illustrated diagrammatically at 258 in Fig. 14. By reason of the arcuate contour at 220 at the rear edges of the side plates 218 of the gate, the necessary power to move the gate into and under the material being collected, is reduced.

In order to enable the separate tractor to push the machine with more power than can be exerted by the power traction unit 37, I have provided a pusher frame 227 as shown in elevation in Fig. 2 and in plan in Fig. 4. The frame 227 diverges forwardly for a pivotal connection at 228 to bracket plates 229 extending rearwardly from the axle housing. A reinforcing rod 230 may connect the plates 229, as shown in Fig. 4.

Between the cross-pieces 231, 232, shown in Fig. 4, is mounted a bolt 233, the lower end of which is shown in Fig. 2.

Connected to the rear end of the pusher frame 227 by means of the upwardly and rearwardly inclined bracket bars 234, 234 is a bumper plate 235 having the contour shown in Fig. 4. Welded to the lower central portion of the bumper plate 235 is a cylinder.

A push plate 236 or bumper is provided with coupling members 237 having openings therein which register with openings in the coupling member 238. The registering openings receive the coupling pin 239. While the plate 236 may oscillate on the vertical axis of the pin 239, it is desirable that it shall not rotate on a longitudinal horizontal axis. When a separate tractor with push plate engages the push plate 236 of Fig. 2, the connection to the push frame 227 is yielding by reason of an interior spring.

In order to tilt the bowl frame from the position shown in Fig. 2 to the position shown in Fig. 5, two extensible hydraulic motors 240, 240 are pivotally connected at their lower ends at 241 to the upper spaced-apart links 60, 60. The motors 240, 240 being reciprocating hydraulic motors each has a piston rod 242 pivotally connected at its upper end at 243 to a rear cross-piece at the upper rear end of the bowl frame. This cross-piece at the upper rear end of the bowl frame supports within the same the bearings 243, 243 for the upper ends of the piston rods 242, 242. Ample space is provided for the rods 242 to change their inclinations relative to the bowl frame, as may be seen by comparing Figs. 2 and 4.

It should be particularly noted that the hydraulic motors 240 are pivoted at their lower ends at 241, 241 on the spaced-apart links 60, 60 and are not connected to any part of the power plant or body framework of the engine or casings containing the transmission gearing for the engine. Likewise the parallel links 60, 60 and the parallel links 61, 61 are connected through the axle housing 57 to the supporting frame 249 but not to any part of the engine frame or any of the casings carried thereby. This arrangement prevents any of the stresses and strains due to the operation of the machine, being transmitted to such castings of the power plant that may not be able to withstand such loads.

The axle housing 57 may be made of steel and therefore fully capable of withstanding all the stresses and strains due to operation of the machine including gathering, hauling and spreading.

Fig. 14 is a piping diagram for the control of the operation of the various hydraulic reciprocating motors and the valve unit 244. The pump 254 is connected to the rear end of the crank shaft of the engine in the position shown in Figs. 2 and 4. A suction pipe 255 is connected between the pump 254 and the supply tank 256 located adjacent the operator's station. A return pipe 257 connects the manifold control valve 258 to the tank 256. A supply pipe 259 leads from the pump 254 to the manifold control valve 258. By means of the valve control levers 261, 262 and 263 the hydraulic motors 213, 221 and 240 may be operated. The valve levers 261, 262 and 263 are located adjacent the operator's station as shown in Fig. 4. A high pressure relief valve 260 is located between the supply pipe 259 and the return pipe 257 and is adapted to be opened in the direction of the arrow 264 when a predetermined maximum pressure is reached.

As shown in Fig. 14, the reciprocating hydraulic motors 221 for operating the gate 217, are connected in multiple so that both motors are operated simultaneously under the control of the valve 262. In a similar manner the reciprocating hydraulic motors 213 are operated in multiple to lift the ejector plate 33 or let it descend, under control of the valve 263. Also in a similar manner the reciprocating hydraulic motors 240 are operated in multiple under control of the valve 261, to control the tilting of the earth carrier or bowl frame 25 on the transverse axis of the steering wheel unit 81.

No valve is located at the operator's station, however, for controlling the reciprocating hydraulic steering motor 129. The valve mechanism 244 for controlling motor 129 is attached to the cylinder of this motor as shown in Fig. 10 and the connections between the operator's steering wheel 43 and this valve mechanism 244 are entirely mechanical. These connections extend along one side of the scraper bowl or carrier and are so flexible that whether the carrier is in its gathering position shown in Fig. 1 or in its transportation position shown in Fig. 5, the mechanism for operating the valve mechanism 244 may be actuated with equal facility by manual rotation of the operator's steering wheel 43.

It should also be noted that when the valves 261, 262 and 263 at the operator's station are closed the hydraulic motors 213, 221 and 240 to which these valves are connected, will be locked in adjusted positions, thus holding in adjusted positions the various parts to which the motors are connected. The arrangement for the hydraulic motor 129 is substantially different, however, since there is no controlling valve at the operator's station for the motor 129 and when the valve mechanism 244 is in neutral position a no-load by-pass is established for free flow of the fluid pressure medium, such as oil, from the supply pipe 165 through the valve mechanism 244 to the return pipe 167. Power is thus conserved because pressure will not be built up to open and hold open the relief valve 260 even when all the valves 261, 262 and 263 at the operator's station are closed.

Nevertheless, when the valve mechanism 244 is in its neutral position, as shown in Fig. 11, the hydraulic motor 129 will have its piston locked against movement in either direction to hold the steering wheel unit rigidly in any adjusted position. This can readily be understood by referring to Fig. 11 where the piston 174 is shown in neutral position cutting off from the pipe 186 both the supply groove 181 and the exhaust groove 182. In the same view the piston 174 is in position to cut off the pipe 187 from both supply and exhaust. The pipe 186 leads to the groove 188 which is confined between the pistons 174 and 175. The pipe 187 leads to the groove 191 which is confined between the pistons 173 and 174. Any tendency of the steering wheel unit to move the cylinder of the hydraulic motor 129 laterally will be completely blocked or resisted because hydraulic pressure on one side of the piston in the motor 129 through the pipe 186 can extend no farther than the groove 188 and the space between the pistons 174 and 175; and because hydraulic pressure on the other side of the piston in the motor 129 through the pipe 187 can extend no farther than the groove 191 and the space between the pistons 173 and 174.

When the deepest cuts are made it is preferred to use the intermediate section 30' of the cutting blade projecting forwardly as shown in Fig. 3 so that the transverse length of the cut will be reduced thereby reducing the necessary power to push the machine forwardly. As stated above, the additional tractor is employed either alone or with the assistance of the power traction unit 37 to operate the machine during the gathering of material by cutting the ground surface with the cutting blade 30. If the cutting blade meets with particularly hard material which renders it difficult for even the additional tractor to operate the cutting blade because the full length of the blade engages such hard material, the additional tractor may engage the push plate 236 at an angle so as to swerve the cutting blade 30 out of its previous path of travel by angling the blade, thus breaking the cut.

The pushing frame remains substantially horizontal throughout all the operations. That is to say, when the bowl frame is in its lowermost position for the cutting blade to dig into the ground, the pushing frame 227 is substantially horizontal and acts in almost a direct line with the lower pair of parallel links 61, 61 to secure maximum forward pushing effect. Of course, there is also a pushing effect through the upper pair of parallel links 60, 60 because the pushing frame is connected to the axle housing and the latter is connected to not only the lower pair of parallel links 61, 61 but also to the upper pair of parallel links 60, 60. During the forward gathering operations by operation of the cutting blade, the motors 240 are locked in adjusted positions being doubel acting motors provided with valve mechanism at 261 to lock the pistons therein against movement in either direction. Irrespective of the depth of cut, the rear end portion of pushing frame 227 remains substantially horizontal and the connections between the bowl frame and the axle housing constitute a rigid structure which is effective to prevent any buckling upwardly of the bowl frame relatively to the power traction unit 37 during cutting and gathering operations. The actual pushing operations through the links 60 and 61 are forwardly and downwardly so as to effectively hold the cutting blade to its work. That the rear end portion of the push frame 227 remains substantially horizontal can readily be seen by comparing Figs. 2 and 5 because in the latter view even when the bowl frame is moved to its transporting position, the rear end portion of the push frame 227 still remains substantially horizontal, the forward portion 227' being downwardly inclined.

The earth mover shown in the accompanying drawings being self-propelled, can whenever desired, be used without an extra pushing tractor for scraping or gathering work and whenever the filled bowl is to be transported the power traction unit 37 alone will be found sufficient. But to save time and to secure increased capacity it is desirable to use the additional pushing tractor, particularly during gathering operations.

The power traction unit may move the machine forwardly at eight different speeds and rearwardly at two different speeds and therefore the spreading operations may be performed by moving the machine forwardly or rearwardly. When moved forwardly the adjusted height of the rear end of the bowl frame will enable the cutting blade 30 to act as a strike-off blade to regulate the depth of the spread material, and when the machine is moved rearwardly the lower edge of the gate 217 may be adjusted to various elevations to act as a strike-off device to regulate the depth of the spread material.

During gathering operations or spreading operations of light character the rods 144 and 149 may be detached and steering effected entirely by manual power exerted on the steering wheel 43 and the mechanical connections between the same and the steering wheel unit. Such manual steering is facilitated by reason of the fact that the steering wheels are spread apart and can roll in a circle on the axis of the front steering post 82. However, if such steering operations with the rods 144, 149 detached, are attempted over rough ground having various depressions therein, the steering wheel unit may be suddenly lurched out of the control of the operator even to such an extent as to block forward movement of the machine.

It is therefore much preferred to use the hydraulic motor 129 when operations over rough ground are being carried on, not only to secure hydraulic power operation of the steering unit so that all the operator need do is to operate the various valve devices, but also to prevent any lurching of the steering wheel unit when it runs into a hole or depression. It should be understood that any such lurching tendency of the steering wheel unit will be completely resisted by the motor 129 because only the hydraulic pressure medium in this motor can effect movement thereof in either direction. The hydraulic pressure in the motor 129 is always so much as to prevent lurching back pressure of the steering wheel unit from overcoming it. If, however, an obstruction to the turning of the steering wheel unit is abnormally great, the relief valve 260 will be automatically opened to protect the apparatus associated with the steering wheel unit.

In order that it may be fully realized that it is highly advantageous to the operator that the work of steering be assumed by the hydraulic motor 129 so the operator may continue to devote his attention primarily to the scooping or gathering operations and the dumping and spreading or leveling operations, for long periods of time with little fatigue, the operation of the machine will be reviewed.

In the first place the operator by means of the valve 261 (Fig. 14) may control the operation of the reciprocating motors 240 to let the scraper bowl or carrier 25 down from its transportation position in Fig. 5 to its operating position in Figs. 1 and 2 placed end to end. By means of the valve 262 (Fig. 14) the operator may control the lateral hydraulic motors 221 to move the gate 217 to its wide open position. By means of the valve 263 he may cause the hydraulic motors 213 to hold the ejector plate in its uppermost position at the back of the carrier frame as shown in dotted lines in Fig. 2.

Now upon application of a separate tractor to the push frame 227, pushing forces will be exerted through the downwardly inclined portion 227' as shown in Fig. 2, on the brackets 229 and through the adjacent portion of the axle housing 57 onto the downwardly inclined and forwardly extending links 61 to the bottom of the scraper bowl frame 25. At the same time, the operation of the power traction unit will exert pushing forces from the axle housing 57 through the links 60 and 61. These links are both downwardly extending when the cutting blade 30 is in ground surface cutting position. The hydraulic motors 240 serve as links to lock the links 60, 61 in adjusted positions relative to both the rear traction unit and the carrier 25. The rear ends of the links 60, 61 have their pivots vertically spaced apart farther than the spacing between the pivots at the forward ends of these links, as illustrated in Fig. 2. Consequently when the rear end of the carrier is elevated as shown in Fig. 5, the rear end portion of the push frame 227 remains horizontal and the forward portion 227' of this frame remains downwardly inclined to maintain better traction for the wheels 36 when the separate tractor is used in addition to the traction unit 37. As shown in Fig. 2ª the links 60 and 61 clear the outside faces of the frame 249 when these links are moved from their positions shown in Fig. 2 to their positions shown in Fig. 5.

When gathering operations are to be effected the gate is opened to a minimum extent. That is, the gate is only partially opened so that as the material enters the bowl or carrier onto the plate 42 it will move upwardly and roll forwardly onto the gate. The gate is kept thus partially open until the material is approximately at the upper edge 219 of the side plates of the gate. The scooping operations are such as to enable the carrier to be made relatively deep thereby reducing the overall length of the machine. When the carrier has been filled, the gate may be gradually closed before the carrier is adjusted to its upper position for transportation to the location where the material is to be spread.

The hauling of the filled carrier may be effected by means of the traction unit 37 without the use of the separate tractor. While being thus hauled, the rear end of the carrier is elevated as shown in Fig. 5, with the gate 217 closed and the ejector plate 33 still held in its rear uppermost position. However, should the ground surface not afford sufficient traction for heavy loads in the carrier, a separate tractor may be added effectively since the rear end portion of the push frame 227 still remains horizontal as shown in Fig. 5.

When spreading is to be effected the gate 217 is gradually opened to let the material out onto the ground surface. The plate 32 is rather steep as shown in Fig. 5 so that if the material is dry it will fall out by gravity. The depth of the material spread may be regulated by adjustment in elevation of the cutting blade 30 to act as a strike-off device.

Release of the material from above the plate 32, particularly if wet, may be facilitated by forward movement of the ejector plate 33 a short distance. Upon restoration of the ejector 33 to its rearmost position the weight thereof is ample to assure movement in the proper direction. This is particularly true when the pivot point 211 is not moved forwardly beyond a plane extending through the pivots 214 and 216. In Fig. 2 a transverse plane through the pivots 214 and 216 is to the left of the pivot 211. The pivot 211 should be kept to the right of such plane as viewed in Fig. 2, or at least not permitted to move to the left of such plane unless the plate 33 is relatively heavy. If the plate 33 is to be relatively light in weight, abutments may be provided on the inner walls of the end plates 26, 26 of the bowl frame, each abutment being in position to be engaged by the adjacent edge of the gate 33 when the latter is to be moved back from its most forward position. One of such abutments is illustrated at 245 in Fig. 2. Upon expansion of the motor 213, if the ejector 33 starts to swing clockwise it will engage such abutments and slide upwardly along the same thus assuring proper restoration of the ejector 33 to its position shown in dotted lines in Fig. 2.

However, by limiting the stroke of the piston rod 212 the extent to which the ejector plate 33 moves forward may be limited to such position that the ejector can never be tilted in the wrong direction even without the abutments 245. With the presence of the abutments 245 the extent of forward movement of the rejector may be increased and the plate 33 made of less weight.

Reverting to the steering post 82 shown in Fig. 6 it should be noted that the opposing thrust roller bearings 88 and 89 serve to lock the steering head in fixed relation to the axis of the rotary steering post 82. The lower roller bearing race 268 surrounds the post 82 and rests on top of the casting 83 at the upper edge of the tapered opening through the latter. The inner race 269 fits against the lower annular shoulder 270 formed by the inner ring 92'. Between this ring 92' and the post 82 is a lubricant seal 271. Another lubricant seal 272 fits between the lowermost inner edge of the tubular section 92 and the upper outer section of the casting 83 as shown in Fig. 6.

At the upper end of the steering post 82 the inner roller bearing race 273 is held in place by the plate 274 and the cap screw 275. A ring 276 holds the outer race 277 in place. A lubricant seal 278 is located between the ring 276 and the post 82. The ring 276 is bolted at 279, 279 to the head section 91. A detachable cover plate 280 encloses the roller thrust bearing 89 as shown in Fig. 6.

It can readily be seen by referring to this view that all up and down movements of the steering wheel unit 81 are imparted to the steering head 90 and that the forward end of the earth carrier together with its load of gathered material are efficiently supported through the goose neck steering head 90 on the steering wheel unit without interfering with the hydraulically operated steering mechanism located in such steering head and under the cover plates 27, 27 as shown in dotted lines in Fig. 3.

Obviously those skilled in the art may make various changes in the details and arrangement of parts without departing from the spirit and scope of the invention as defined by the claims hereto appended, and I therefore wish not to be restricted to the precise construction herein disclosed.

Having thus described and shown an embodi- ment of my invention, what I desire to secure by Letters Patent of the United States is:

1. An earth mover comprising the combination with a scraper bowl, of a steering wheel unit having horizontal and vertical axes, mechanism for carrying the front end of said bowl on said steering wheel unit for tilting movements relatively to the latter on said horizontal axis, the steering wheel unit itself being swingable on said vertical axis, a wheeled supporting unit, means between said wheeled supporting unit and the rear end of said scraper bowl for effecting such tilting movements, a fluid pressure motor on the front end portion of said scraper bowl operatively connected to said steering wheel unit, and mechanism supported in part on said bowl and extending from a station on said wheeled supporting unit to said motor to control the latter to effect swinging of the steering wheel unit on said vertical axis.

2. An earth mover comprising the combination with a steering wheel unit, of a scraper bowl, a supporting unit, means for supporting the front end of said scraper bowl on said steering wheel unit, means for supporting the rear end of said scraper bowl on said supporting unit, said scraper bowl being mounted between said steering wheel unit and said supporting unit for tilting adjustment relative to the supporting unit, fluid-pressure motor operated mechanism mounted on said bowl and operatively connected to said steering wheel unit, and means extending from the operator's position on said supporting unit to said fluid-pressure motor operated mechanism to control the latter to effect operation of said steering wheel unit.

3. An earth mover comprising the combination with an earth carrier, of a steering wheel unit, a goose neck steering head secured rigidly to said carrier, mechanism carried by said head for actuating said steering wheel unit, a supporting unit rearwardly of said carrier, supporting connections between the rear end of said earth carrier and the front end of said supporting unit for carrying the rear end of said earth carrier at adjusted elevations, a fluid pressure motor on the front end of said carrier and operatively connected to said steering wheel unit, and means extending from a station on said supporting unit along one side of said carrier and along the front end of the latter to said motor for controlling the steering operations thereof irrespective of the position to which the rear end of the earth carrier is adjusted relative to said supporting unit.

4. An earth mover comprising the combination with a scraper bowl, of a steering wheel unit for carrying the front end of said scraper bowl, a supporting unit, adjustable mechanism between the rear end of said bowl and the front end of said supporting unit for supporting the rear end of the scraper bowl at various elevations relative to the ground surface, the sole support for the front end of the scraper bowl being said steering wheel unit and the sole support for the rear end of said scraper bowl being the front end portion of the supporting unit and the said adjustable supporting mechanism, the scraper bowl occupying the space between said steering unit and the front end of said supporting unit, a hydraulic motor connected between said scraper bowl and said steering unit, valve mechanism for controlling said hydraulic motor, and means extending from an operator's station on said supporting unit along said scraper bowl to said valve mechanism to operate the latter irrespective of the adjusted elevation of the scraper bowl.

5. An earth mover comprising the combination with a steering wheel unit, of a scraper bowl having its front end supported on said steering wheel unit, a supporting unit rearwardly of said scraper bowl, means for supporting the rear end of said scraper bowl on the front end portion of said supporting unit for tilting adjustment of the scraper bowl on the horizontal transverse axis of the steering wheel unit, a reciprocating hydraulic motor mounted on the upper forward end of said scraper bowl and connected between the latter and said steering wheel unit, valve mechanism attached to said motor for controlling the same, and means for operating said valve mechanism from said supporting unit.

6. An earth mover comprising the combination with a steering unit, of a scraper bowl having its front end supported on said steering unit, a unit for supporting the rear end of said scraper bowl for tilting adjustment of the bowl on the transverse axis of said steering unit, a fluid pressure motor mounted on said scraper bowl, actuating connections between said fluid pressure motor and said steering unit, and means for controlling the operation of said motor from a station on said supporting unit.

7. An earth mover comprising the combination with a bowl frame, of a steering unit at one end of the bowl frame, a supporting unit connected to the other end of the bowl frame, an operator's station on said supporting unit, means between said supporting unit and said bowl frame for tilting the latter on the steering unit as a pivot, an intermediate lever pivoted to said bowl frame to rock relatively thereto, a drag link extending from said lever toward that end of the bowl frame where the steering unit is located, an additional drag link extending from said lever toward the other end of said bowl frame, a fluid pressure motor on said bowl frame, actuating connections between said motor and said steering unit, valve mechanism for controlling said motor, actuating means extending from said additional drag link to said operator's station, and additional actuating means between said first-named drag link and said valve mechanism, the construction and arrangement being such that irrespective of the elevation of the rear end of said bowl frame relative to said supporting unit actuation of said first-named drag link from said operator's station will operate said valve mechanism to control said steering unit.

8. An earth mover comprising the combination with a bowl, of a steering unit at one end of said bowl, a supporting unit at the other end of the bowl, an operator's station on said supporting unit, means between the supporting unit and the bowl for tilting the latter on the transverse axis of said steering unit, an intermediate steering lever pivoted to one side of the bowl to rock relatively thereto, a drag link extending from said lever toward that end of the bowl where the steering unit is located, an additional drag link extending from said lever toward the other end of the bowl, a fluid pressure motor on said bowl, actuating connections between said motor and said steering unit, valve mechanism for controlling said motor, means operatively connecting said first named drag link to said valve mechanism, actuating connections extending from the operator's station on said supporting unit to said additional drag link, and a connection between said bowl and said motor to cause operation of the latter to automatically restore said valve mechanism to initial steering unit holding position.

9. An earth mover comprising the combination with a two wheel power traction unit tiltable on the axis of the supporting wheels and comprising an axle housing, a pusher frame connected to said power traction unit including a pivotal connection to said axle housing to support the rear end portion of said pusher frame in horizontal position for engagement by a separate pushing tractor, the forward portion of said pusher frame being downwardly inclined from its rear horizontal portion to said pivotal connection, an earth carrier, front supporting means for said carrier, a plurality of links connecting said axle housing to the lower rear portion of said carrier, and a plurality of extensible fluid pressure motors connected between some of said links and the upper rear portion of said carrier to adjust the elevation of the latter, said motors serving as links and serving to co-operate with the aforesaid plurality of links and their connections between the axle housing and said carrier to maintain said pusher frame with its rear end portion substantially horizontal and its forward portion downwardly inclined from said horizontal portion for the various elevated positions of the carrier.

10. An earth mover comprising the combination with a carrier frame having a forward bottom opening therein, of a moldboard plate extending upwardly and rearwardly from the rear edge of said opening, an ejector plate extending upwardly from the rear end portion of said moldboard plate, mechanism for connecting said ejector plate to the rear end of said carrier frame for movement toward said opening by gravity while the lowermost edge of said ejector plate scrapes downwardly and forwardly along said moldboard plate, means comprising fluid-pressure motor mechanism pivotally connected between the rear end of said carrier frame and the back of said ejector to pull downwardly on the latter to assist the aforesaid gravity action in forcing material out of the rear portion of said carrier frame, and abutment mechanism on said carrier frame in position to be engaged by said ejector to limit movement of the latter relatively to said carrier frame when said ejector is being restored to initial position, the construction and arrangement being such that when said fluid-pressure motor mechanism is contracted the ejector plate is pulled down for forward movement toward said opening and when said motor mechanism is expanded restoration of said ejector plate will be compelled by said abutment mechanism.

CECIL E. PATTERSON.